US011565196B2

(12) United States Patent
Karlin et al.

(10) Patent No.: US 11,565,196 B2
(45) Date of Patent: Jan. 31, 2023

(54) BIOPROCESS SYSTEM

(71) Applicant: Cytiva Sweden AB, Uppsala (SE)

(72) Inventors: Anna Karlin, Uppsala (SE); Jan-Erik Lynga, Uppsala (SE); Mike Peters, Uppsala (SE); Fredrik Lundstrom, Uppsala (SE); Mats Rimmo, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 241 days.

(21) Appl. No.: 16/757,804

(22) PCT Filed: Oct. 25, 2018

(86) PCT No.: PCT/EP2018/079354
§ 371 (c)(1),
(2) Date: Apr. 21, 2020

(87) PCT Pub. No.: WO2019/081684
PCT Pub. Date: May 2, 2019

(65) Prior Publication Data
US 2021/0093983 A1 Apr. 1, 2021

(30) Foreign Application Priority Data
Oct. 26, 2017 (GB) .................................. 1717652

(51) Int. Cl.
*B01D 15/14* (2006.01)
*B01D 19/00* (2006.01)
(Continued)

(52) U.S. Cl.
CPC ......... *B01D 15/14* (2013.01); *B01D 19/0057* (2013.01); *B01D 29/90* (2013.01);
(Continued)

(58) Field of Classification Search
CPC ................ B01D 15/14; B01D 19/0057; B01D 2201/16; B01D 29/90; F04B 23/04;
(Continued)

(56) References Cited

U.S. PATENT DOCUMENTS 3,516,691 A * 6/1970 Williams ................ F16L 39/00
285/242
3,687,009 A * 8/1972 Palmer .................... F16L 37/56
285/915
(Continued)

FOREIGN PATENT DOCUMENTS

EP 2208534 A1 7/2010
EP 2415856 A1 2/2012
(Continued)

OTHER PUBLICATIONS

PCT International Search Report and Written Opinion for PCT Application No. PCT/EP2018/079354 dated Jan. 17, 2019 (9 pages).
(Continued)

*Primary Examiner* — Terry K Cecil
(74) *Attorney, Agent, or Firm* — Eversheds Sutherland (US) LLP

(57) ABSTRACT

A base station (1) and a bioprocess system (3), wherein said base station (1) comprises: a frame or housing (5), wherein said frame or housing comprises a number of valves (7a-f, 9a-d, 11a-f, 13a-e, 15a-f) into which a disposable tubing set (21) during run of the system is provided such that at least one inlet (23a-j) of the disposable tubing set is connected to at least one outlet (25a-f) of the disposable tubing set via a bioprocess separation device (31) of the bioprocess system (3); a movable pump holding device (35), which can be provided in at least two different positions, whereof one is within the frame or housing (5) and another is at least partly outside the frame or housing (5) and which comprises at least one pump main body (37), said pump mainbody comprising a connection (39) configured for connecting to a disposable pump connection part (27) comprised in the disposable tubing set (21).

13 Claims, 4 Drawing Sheets

(51) Int. Cl.
  *B01D 29/90* (2006.01)
  *F04B 53/22* (2006.01)
  *F04B 23/04* (2006.01)
(52) U.S. Cl.
  CPC .............. *F04B 23/04* (2013.01); *F04B 53/22* (2013.01); *B01D 2201/16* (2013.01)
(58) Field of Classification Search
  CPC . F04B 43/00; F04B 53/22; B01L 1/52; G01N 30/88
  See application file for complete search history.

(56) References Cited

U.S. PATENT DOCUMENTS

| | | | |
|---|---|---|---|
| 5,846,224 | A * | 12/1998 | Sword .................... A61M 5/44 604/113 |
| 8,921,096 | B2 * | 12/2014 | Weissenbach ............ B01L 1/52 435/308.1 |
| 2009/0215022 | A1 | 8/2009 | Page et al. |
| 2012/0031510 | A1 | 2/2012 | Weissenbach et al. |

FOREIGN PATENT DOCUMENTS

| | | |
|---|---|---|
| JP | 2004517680 A | 6/2004 |
| JP | 2009533154 A | 9/2009 |
| JP | 2012055306 A | 3/2012 |
| JP | 2016502911 A | 2/2016 |
| WO | 2002/056992 A1 | 7/2002 |
| WO | 2007120812 A2 | 10/2007 |
| WO | 2007/136821 A1 | 11/2007 |
| WO | 2014109900 A2 | 7/2014 |
| WO | 2017/025210 A1 | 2/2017 |
| WO | 2017/109071 A1 | 6/2017 |

OTHER PUBLICATIONS

Great Britain Search Report for GB Application No. 1717652.0 dated Aug. 1, 2018 (3 pages).
CN Office Action CN102372015A, dated Mar. 14, 2012, with English Translation (10 pages).
Office Action Issued in Japanese Patent Application No. 2020-523362, dated Sep. 5, 2022 with English Summary (8 pages).

* cited by examiner

BIOPROCESS SYSTEM

CROSS REFERENCE TO RELATED APPLICATIONS

This application claims the priority benefit of PCT/EP2018/079354 filed on Oct. 25, 2018, which claims priority benefit of Great Britain Patent Application No. 1717652.0 filed on Oct. 26, 2017, the entire contents of which are hereby incorporated by reference herein.

TECHNICAL FIELD OF THE INVENTION

The present invention relates to a bioprocess system and to a base station of a bioprocess system.

BACKGROUND OF THE INVENTION

For large bioprocess systems such as chromatography or filtering systems flow paths within the system have traditionally been provided stationary in the system as metal or plastic pipes. These pipes need to be sanitized between different processes performed in the system. Especially in smaller bioprocess systems the flow paths are nowadays often instead provided as flexible, disposable tubing. Hereby the whole flow path can be exchanged between different processes. When exchanging the disposable tubing access is needed to valves into which the tubing need to be connected and pumps to which the tubing should be connected. A problem may be to get good access for an easy exchange of disposable tubing and another problem may be that the systems are bulky.

SUMMARY

An object of the invention is to provide an improved bioprocess system comprising a disposable tubing set where the disposable tubing set can be easily exchanged.

This is achieved in a base station and in a bioprocess system according to the independent claims.

According to one aspect of the invention there is provided a bioprocess system comprising: a base station (1) including a frame or housing (5), wherein said frame or housing comprises plural valves (7a-f,9a-d,11a-f,13a-e,15a-f) for controlling fluid flow in the system and configured to be releasably fluidically connectable to a disposable tubing set (21); and a discrete movable pump holding device (35), at least partially containable within the frame or housing (5) and removable therefrom and which comprises at least one pump main body (37), said pump main body comprising a fluid connection (39) configured to be releasably connectable to a pump connection part (27) of the disposable tubing set (21).

Expressed in a different manner the invention provides a base station of a bioprocess system. Said base station comprises:
a frame or housing, wherein said frame or housing comprises a number of valves into which a disposable tubing set during run of the system may be provided such that at least one inlet of the disposable tubing set is connected to at least one outlet of the disposable tubing set via a bioprocess separation device of the bioprocess system; and
a movable pump holding device, which can be provided in at least two different positions, whereof one is within the frame or housing and another is at least partly outside the frame or housing and which comprises at least one pump main body, said pump main body comprising a connection configured for connecting to a disposable pump connection part comprised in the disposable tubing set.

According to another aspect of the invention a bioprocess system is provided comprising a base station as defined above, a disposable tubing set and a bioprocess separation device.

Herby the pumps of the bioprocess system can be provided both inside the frame or housing and at least partly outside the frame or housing. Hereby the pumps can be easily accessed to change pump heads, for connection of tubing and for maintenance. The pumps can also be provided completely within the frame or housing during run of the system. Hereby a less bulky system is provided compared to if the pump heads always need to be provided outside the system and access for maintenance of the pumps is required.

In one embodiment of the invention said movable pump holding device comprises a trolley on wheels and said frame or housing comprises an empty space in a bottom part of the frame or housing for receiving said movable pump holding device.

In one embodiment of the invention said frame or housing comprises four walls constituting together with a roof of the frame or housing essentially a box, wherein the valves of the frame or housing are provided on at least three of said four walls and wherein a first wall of said four walls comprises an opening for receiving the movable pump holding device into an empty space of a bottom part of the frame or housing and wherein a second wall of said four walls comprises an inlet valve access opening through which access to at least one inlet valve positioned within the frame or housing is achieved.

In one embodiment of the invention said outlet valves of the frame or housing are provided on a third wall of said four walls.

In one embodiment of the invention at least five separation device valves are provided for receiving the disposable tubing set for controlling feeding of a fluid in the disposable tubing set either upflow or downflow through or bypass a bioprocess separation device connected to the disposable tubing set.

In one embodiment of the invention said at least five separation device valves are provided in the third wall of said four walls but at a lower position than the outlet valves.

In one embodiment of the invention said frame or housing comprises a holder for a disposable air trap of the disposable tubing set, wherein said holder for a disposable air trap is provided above said inlet valves.

In one embodiment of the invention said valves are pinch valves.

In one embodiment of the invention said disposable tubing set comprises:
at least one inlet tubing;
at least one outlet tubing;
at least one disposable pump connection part connected to the inlet tubing and configured for being connected to a pump main body;
at least one disposable air trap; and
two separation device connection points for connection to a bioprocess separation device,
wherein said at least one outlet tubing is connected to said at least one inlet tubing via the other components of the disposable tubing set.

In one embodiment of the invention said disposable air trap is a disposable swirl type air trap.

In one embodiment of the invention said disposable tubing set further comprises one or more of a disposable UV sensor, a disposable flow sensor, a disposable air sensor, a disposable pH meter, a disposable conductivity meter and a disposable pressure meter.

In one embodiment of the invention all the components of the disposable tubing set are connected and the disposable tubing set can be removed from the base station in one piece.

DETAILED DESCRIPTION OF THE EMBODIMENTS

Figure 1A:
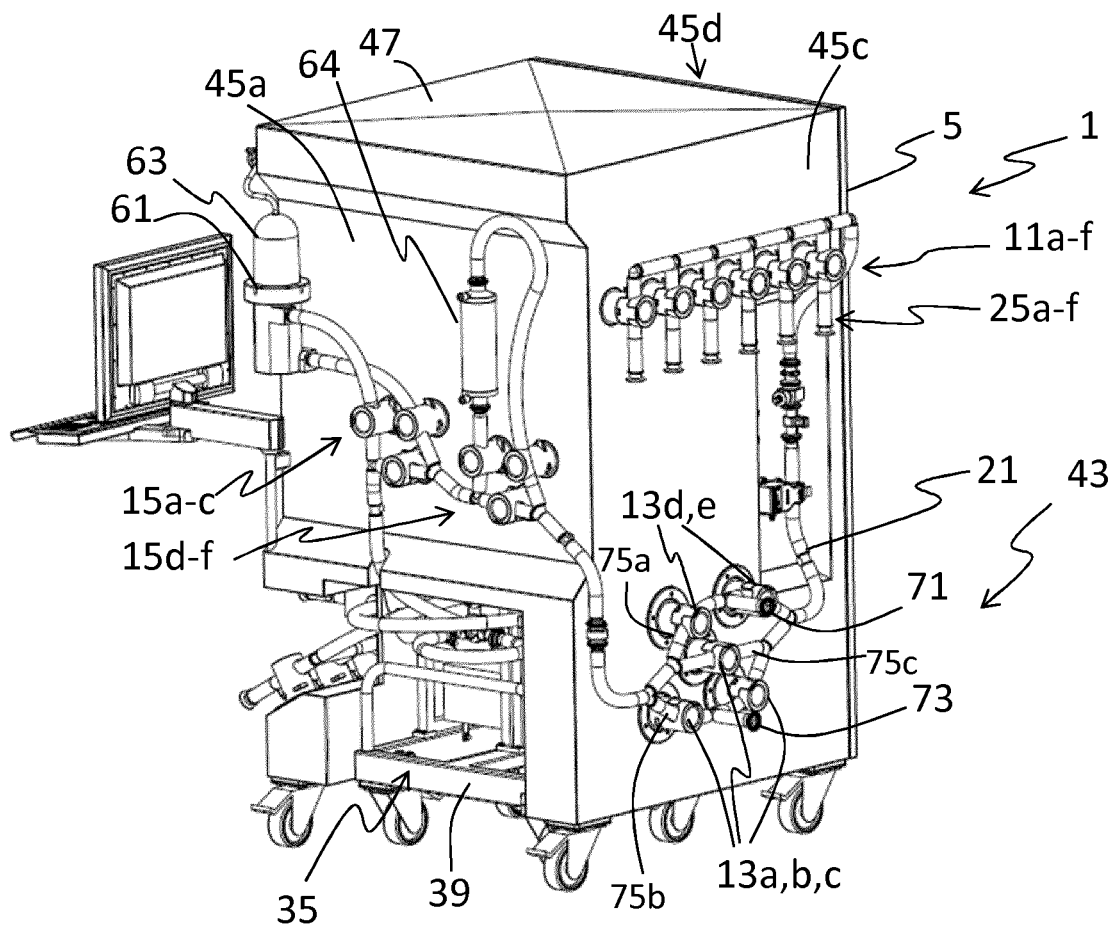
FIGS. 1a and 1b show two different perspective views of a base station of a bioprocess system according to one embodiment of the invention. Disposable tubing is connected to the base station.
Figure 1B:
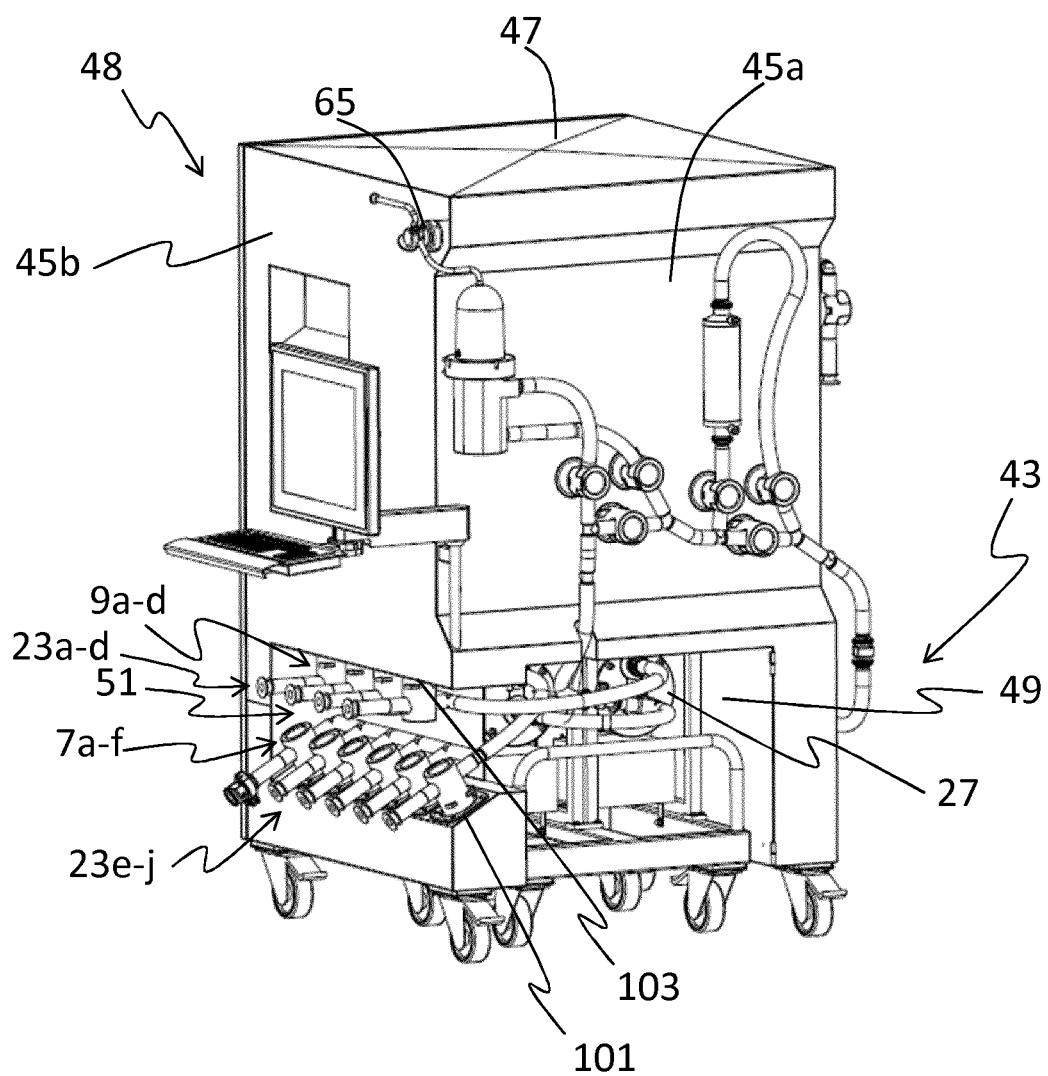
Figure 2A:
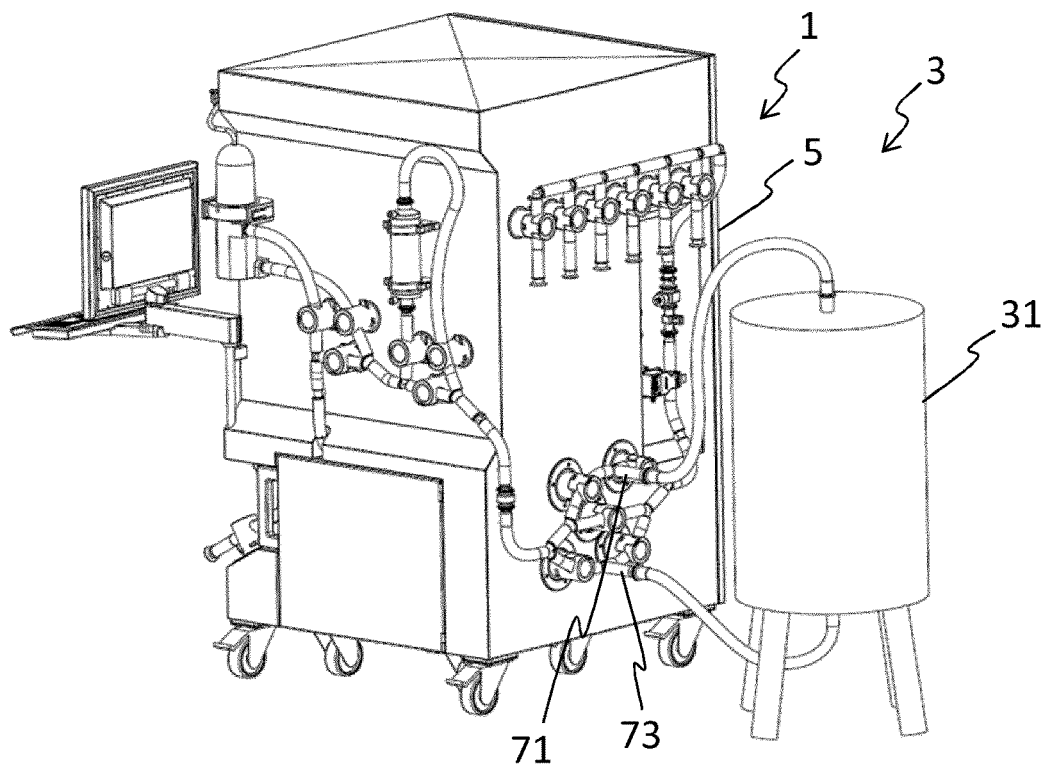
FIGS. 2a and 2b show two different perspective views of a bioprocess system according to one embodiment of the invention.
Figure 2B:
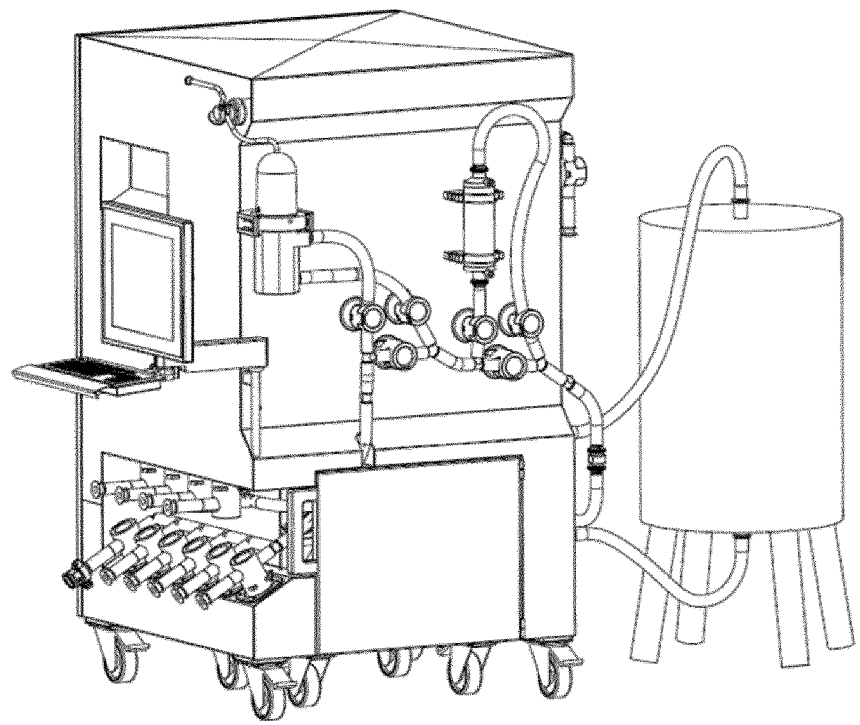
Figure 3A:
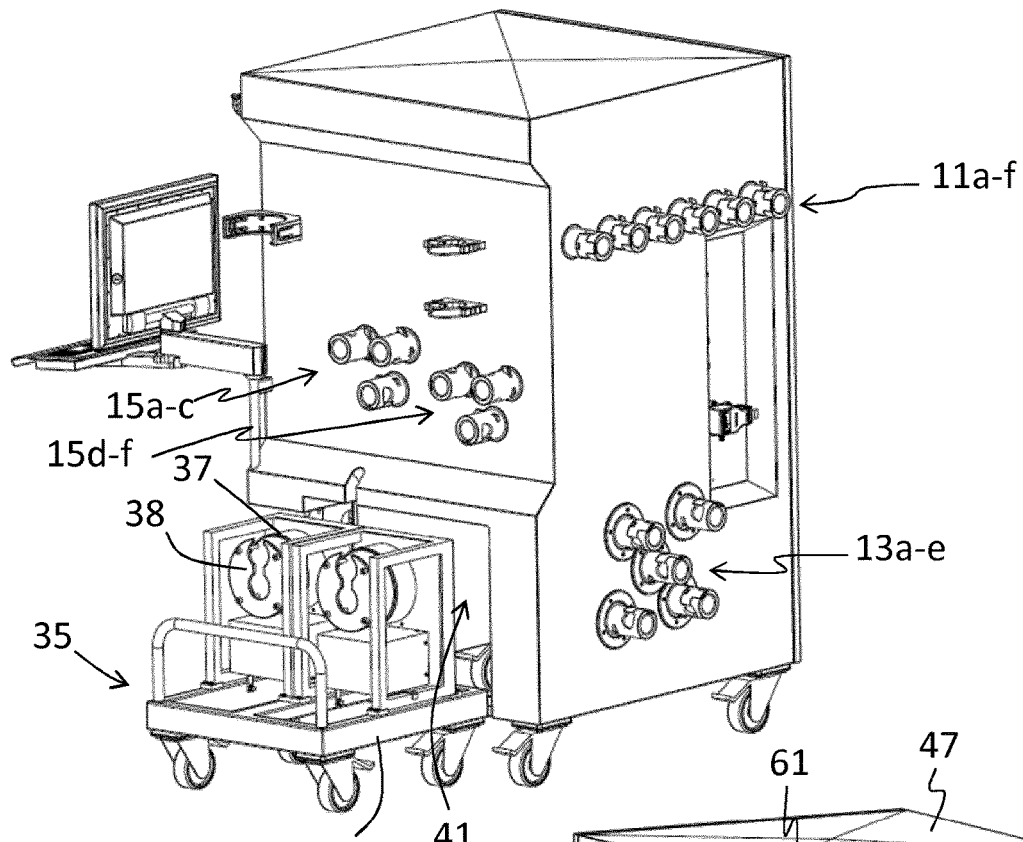
FIGS. 3a and 3b show two different perspective views of a base station according to one embodiment of the invention. A movable pump holding device of the base station is here provided outside a frame or housing of the base station.
Figure 3B:
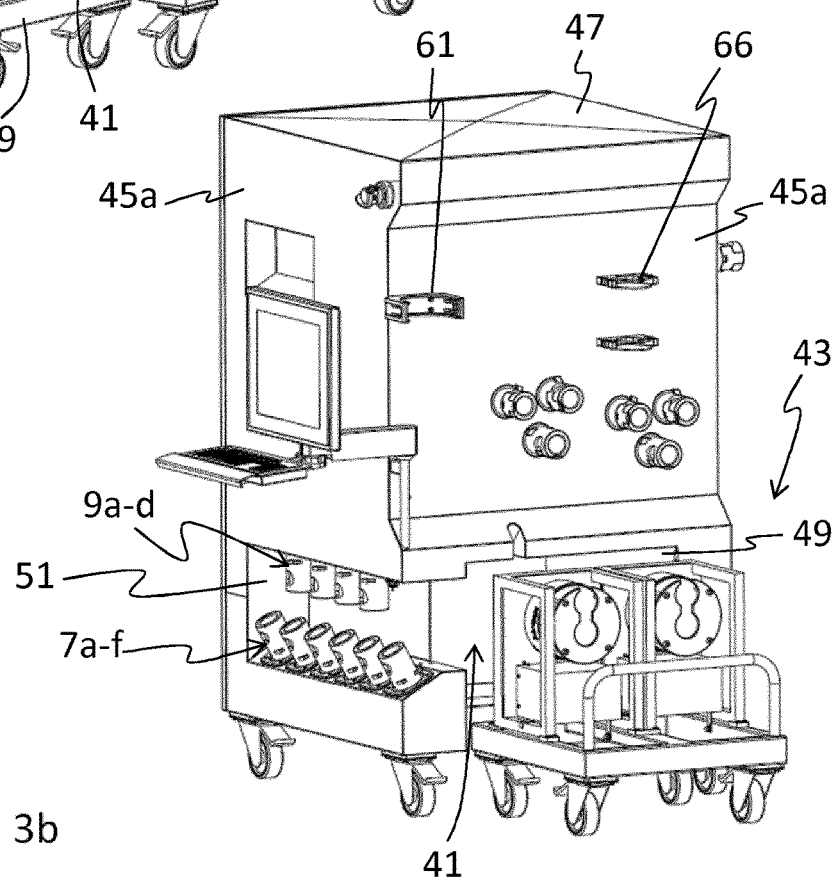

FIGS. 1a and 1b show two different perspective views of a base station 1 of a bioprocess system according to one embodiment of the invention. FIGS. 2a and 2b show the same base station as shown in FIGS. 1a and 1b but also connected to a bioprocess separation device 31. Hereby FIGS. 2a and 2b show two different perspective views of a bioprocess system 3 according to one embodiment of the invention. FIGS. 3a and 3b show two different perspective views of the same base station as shown in FIGS. 1a and 1b but without a disposable tubing set connected.

The invention relates to a base station 1 of a bioprocess system 3 and to a bioprocess system 3 comprising such a base station 1. A bioprocess system according to the invention comprises a base station 1, a disposable tubing set 21 connected to the base station and a separation device 31, such as for example a chromatography column or a filter which is connected to the disposable tubing set. A separation device 31 is not shown in FIGS. 1a and 1b but in FIG. 2a and 2b. The base station 1 comprises valves and pumps (further described and numbered below) to which the disposable tubing set will be connected. Furthermore the base station 1 suitably comprises some type of controlling capability for controlling the valves and pumps during run of the bioprocess system. This control will not be described further.

The base station 1 according to the invention comprises a frame or housing 5, wherein said frame or housing comprises a number of valves 7a-f,9a-d,11a-f,13a-e,15a-f into which a disposable tubing set 21 during run of the system is provided such that at least one valve inlet 23a-j is connected to at least one outlet 25a-f of the disposable tubing set via a bioprocess separation device 31 of the bioprocess system 3. In this embodiment of the invention 10 separate inlets 23a-j are provided. Of course the number of inlets can be varied. In this embodiment of the invention the inlets 23a-j are separated into two groups. A first group comprises four inlets 23a-d, called first inlets 23a-d, which are provided above a second group comprising six inlets 23e-j, called second inlets 23e-j. All the inlets 23a-j can be used for feeding of for example buffer and sample into the system. Of course the number of first and second inlets 23a-j can be varied. Each of the inlets 23a-j are during run of the bioprocess system connected to a valve 7a-f, 9a-d provided on the base station 1. The valves 7a-f to which the second inlets 23e-j are connected are called second inlet valves 7a-f and the valves 9a-d to which the first inlets 23a-d are connected are called first inlet valves 9a-d. Of course the number of first and second inlet valves 9a-d, 7a-f can vary in the base station. In this embodiment of the invention furthermore six different outlets 25a-f of the disposable tubing set 21 are provided. Of course the number of outlets 25a-f can vary within the scope of the invention. Accordingly in this embodiment of the invention six outlet valves 11a-f are provided in the base station 1. During run of the system the outlets 25a-f of the disposable tubing set 21 are provided connected one to each of these outlet valves 11a-f. Of course also the number of outlet valves 11a-f can be varied.

The disposable tubing set 21 will be connected to a bioprocess separation device 31 during run of the system. The disposable tubing set 21 comprises two separation device connection points 71, 73 which can be seen in FIG. 1a. The disposable tubing is branched such that one branch 75a of the tubing comprises one of the separation device connection points 71 and another branch 75b comprises the other separation device connection point 73. Furthermore, in this embodiment also a bypass branch 75c of the tubing is provided in between the other two branches 75a,b. The three branches are collected into one tubing before and after the separation device connection points 71, 73. The base station 1 comprises separation device valves 13a-e to which said branches 75a,b,c of the disposable tubing are connected during run. One separation device valve is provided on each side of each separation device connection point 71, 73 and one separation device valve is also provided to the bypass branch. By this arrangement of separation device valves 13a-e and the branching of the disposable tubing set 21 for the connection of the separation device 31, the separation device 31 can be connected for both upflow separation (liquid flow upwardly through the device 31) and downflow separation (liquid flow downwardly through the device) without the need of any rearranging of the tubing but only by control of the separation device valves 13a-e. Furthermore the separation device 31 can also be bypassed. However, also a simpler arrangement of separation device valves without this possibility of switching between upflow and downflow separation is covered by the invention. In such a system no branching of the disposable tubing around the separation device connection points 71, 73 is needed and furthermore only three separation device valves would be needed.

Furthermore in the base station 1 as shown in FIGS. 1a and 1b six more valves 15a-f are provided. These are provided for allowing bypass or connection of separate components of the disposable tubing set 21 and are also called component bypass valves 15a-f. In this embodiment of the invention an air trap 63 and a filter cartridge 64 of the disposable tubing set 21 are connected to these component bypass valves 15a-f. If no bypass of these components is needed these valves can be omitted in the base station 1. An additional air vent valve 65 is in this embodiment also provided on the frame or housing 5 to which an air vent tube from the air trap 63 can be connected.

The valves 7a-f,9a-d,11a-f,13a-e,15a-f, 65 connected to the frame or housing 5 of the base station 1 can for example be pinch valves or membrane valves.

According to the invention the base station 1 comprises further a movable pump holding device 35. The movable pump holding device 35 can be provided in at least two different positions, whereof one is within the frame or housing 5 and another is at least partly outside the frame or housing 5. The movable pump holding device 35 comprises at least one pump main body 37. In the embodiment shown in FIGS. 1 and 3 the movable pump holding device 35 comprises two pump main bodies 37 however the number of pump main bodies can be varied within the scope of the invention. Each pump main body 37 comprises a pump connection 38 configured for connecting to a disposable pump connection part 27, for example a disposable pump head, comprised in the disposable tubing set 21.

In the embodiment of the invention as shown in FIGS. 1-3 the movable pump holding device 35 comprises a trolley on wheels 39. Furthermore the frame or housing 5 comprises an empty space 41 in a bottom part 43 of the frame or housing 5 for receiving said movable pump holding device 35. An alternative to a trolley on wheels 39 for the movable pump holding device 35 can be to provide rails to the frame or housing 5 such that the movable pump holding device 35 can be mounted to the rails and moved along the rails to a position within and at least partly outside the frame or housing. However an advantage with providing the movable pump holding device separately on a trolley on wheels 39 is that vibrations from the pumps when they are running are not transferred to the rest of the system. This may be a problem in traditional systems where the pumps are mounted in the system. Another advantage with providing the pump main bodies 37 on a movable pump holding device 35 according to the invention is that both a less bulky system with pumps completely hidden within the system can be achieved while at the same time good access to the pumps easily can be achieved by moving the movable pump holding device 35 outside the frame or housing 5. Access to the pumps is for example needed when the disposable tubing set should be exchanged and when maintenance of the pumps is needed. In a traditional system where the pumps are fixedly mounted to the system they need to be mounted such that they both are accessible for connection and for maintenance. This probably requires access from more than one side of the pumps. Hereby the systems are often bulky and parts of the pumps are protruding out from the system. This requires more space in the room.

In the embodiment of the invention as shown in FIGS. 1-3 the frame or housing 5 comprises four walls 45*a,b,c,d* constituting together with a roof 47 of the frame or housing 5 essentially a box 48. Hereby a compact design of the base station is achieved. The valves 7*a-f,*9*a-d,*11*a-f,*13*a-e,*15*a-f* of the frame or housing 5 are in this embodiment of the invention provided on two of these walls 45*a*, 45*c* and within an opening 51 of another one of the walls 45*b* which will be further described below. A first wall 45*a* of said four walls comprises an opening 49 for receiving the movable pump holding device 35 into the empty space 41 of the bottom part 43 of the frame or housing 5. In the embodiment shown in FIGS. 1-3, but not necessarily, a second wall 45*b* of said four walls comprises an inlet valve access opening 51 through which access to the inlet valves 7*a-f,* 9*a-d* of the frame or housing is achieved. Alternatively the inlet valves 7*a-f,* 9*a-d* are provided mounted to one of the walls 45*a,b, c,d*. However an advantage of providing the inlet valves 7*a-f,* 9*a-d* within an opening 51 of one of the walls 45*b* as shown in FIGS. 1-3 is that the base station will be less bulky and access to the inlets is convenient when the disposable tubing set 21 is provided to the base station 1. Furthermore tubing can be made shorter and be kept inside the system in an efficient way. A minimum of tubing length in the disposable tubing set 21 is advantageous for process efficiency, saving of sample and overall performance and measuring accuracy. Hereby the opening 51 is suitably provided in a bottom part 43 of the frame or housing 5 close to the movable pump holding device 35 when the movable pump holding device 35 is provided inside the frame or housing 5. In the embodiment as shown in FIGS. 1-3 the second inlet valves 7*a-f* are provided on a lower surface 101 of the frame or housing 5 surrounding the opening 51 and the first inlet valves 9*a-d* are provided on an upper surface 103 of the frame or housing surrounding the opening 51. The lower surface 101 is shown to be inclined and the upper surface is shown to be flat however both the surfaces can be either flat or inclined. These are only design alternatives for providing good access.

In the embodiment as shown in FIGS. 1-3 the first wall 45*a* also comprises the component bypass valves 15*a-f* and a third wall 45*c* comprises both the outlet valves 25*a-f* and the separation device valves 13*a-e*. The third wall 45*c* is opposite the second wall 45*b* in the box 48. Furthermore the outlet valves 25*a-f* are provided above the separation device valves 13*a-e* on the third wall 45*c* referring to directions in the drawings and how the base station will be provided onto a floor. The outlet valves 25*a-f* are positioned above the connection points 71, 73 to the separation device 31 to ensure that all instruments are fully filled with liquid during operation even at low flow rates.

Three of the component bypass valves 15*a-c* may be for connection of an air trap 63 of the disposable tubing set 21 and the other three of the component bypass valves 15*d-f* may be for connection of a filter cartridge 64. An air trap holder 61 and a filter cartridge holder 66 can be provided on the first wall 45*a*. The air trap holder 61 can be provided on the first wall 45*a* of the frame or housing 5 at a higher position than the pumps. Hereby a raising flow from inlet to the air trap 63 is provided which is suitable for allowing air to get out from the system through the air trap.

The disposable tubing set 21 of the bioprocess system 3 comprises as mentioned above at least one inlet tubing 23*a-j*, at least one outlet tubing 25*a-f*, at least one disposable pump connection part 27, for example a pump head, which is connected to the inlet tubing 23*a-j* and configured for being connected to a pump main body 37. The disposable tubing set 21 comprises further according to one embodiment of the invention at least one disposable air trap 63 and two separation device connection points 71, 73 for connection to a bioprocess separation device 31. Said at least one outlet tubing 25*a-f* is connected to said at least one inlet tubing 23*a-j* via the other components 27, 63, 71, 73 of the disposable tubing set 21.

The disposable air trap 63 is in one embodiment of the invention a swirl type air trap. Such an air trap requires less volume than a traditional air trap where inlet and outlet both are provided in a bottom of the air trap. In the swirl type air trap a housing in a cylindrical form is provided with an inner central rod around which the fluid is circling. An inlet to the cylindrical housing is provided through a wall of the housing and in a direction such that the fluid provided into the housing is provided along a wall of the housing. Hereby the fluid will swirl around the inner central rod. An outlet from the air trap is provided in a bottom of the cylindrical housing, i.e. below the inlet. Furthermore a venting opening for letting gas out is provided in the top of the air trap. The whole air trap 63 is made from plastic and is thus disposable together with the rest of the disposable tubing set 21.

The disposable tubing set 21 may further comprise one or more of the following disposable components: a disposable UV sensor, a disposable flow sensor, a disposable air sensor, a disposable pH meter, a disposable conductivity meter and a disposable pressure meter. According to the invention the complete tubing set with components as specified above, such as pump heads, air trap, UV sensors etc. is provided in materials suitable for being disposable, i.e. low cost and suitable for being gamma irradiated or sanitized in another way. Furthermore the whole disposable tubing set 21 with its connected components can be removed in one piece, i.e. all parts connected. Hereby an easy handling of the product is achieved.

The invention claimed is:

1. A bioprocess system comprising:
    a base station including a frame or housing, wherein said frame or housing comprises plural valves for controlling fluid flow in the system and configured to be releasably fluidically connectable to a disposable tubing set;
    a discrete movable pump holding device, at least partially containable within the frame or housing and removable therefrom and which comprises at least one pump main body, said pump main body comprising a fluid connection configured to be releasably connectable to a pump connection part of the disposable tubing set,
    wherein a pump head is absent from the discrete movable pump holding device, and
    wherein the pump connection part comprises the pump head.

2. The bioprocess system according to claim 1, wherein said movable pump holding device comprises a trolley on wheels and wherein said frame or housing comprises a void in a bottom part of the frame or housing for receiving said movable pump holding device.

3. The bioprocess system according to claim 1, wherein said frame or housing comprises four walls constituting together with a roof of the frame or housing essentially a box, wherein the valves of the frame or housing are provided on at least three of said four walls and wherein a first wall of said four walls comprises an opening for receiving the movable pump holding device into an empty space of a bottom part of the frame or housing and wherein a second wall of said four walls comprises an inlet valve access opening through which access to at least one inlet valve positioned within the frame or housing is achieved.

4. The bioprocess system according to claim 3, wherein outlet valves of the frame or housing are provided on a third wall of said four walls.

5. The bioprocess system according to claim 3, wherein said frame or housing comprises a holder for a disposable air trap of the disposable tubing set, wherein said holder for a disposable air trap is provided above said at least one inlet valve.

6. The bioprocess system according to claim 1, wherein at least five separation device valves are provided for receiving the disposable tubing set for controlling feeding of a fluid in the disposable tubing set in either upflow or downflow separation directions or bypass of a bioprocess separation device connected or connectable to the disposable tubing set.

7. The bioprocess system according to claim 4 wherein at least five separation device valves are provided in the third wall of said four walls but at a lower position than the outlet valves.

8. The bioprocess system according to claim 1, wherein at least one of said valves are pinch valves.

9. The bioprocess system according to claim 1 and further including the disposable tubing set and a bioprocess separation device connected or connectable to said tubing set.

10. The bioprocess system according to claim 9, wherein said disposable tubing set comprises components including:
    at least one inlet tube;
    at least one outlet tube;
    at least one pump connection part connected to the inlet tubing and configured for being connected to the pump main body;
    at least one air trap; and
    two separation device connection points for connection to a bioprocess separation device,
    wherein said components are fluidically interconnected between the at least one outlet tube and the at least one inlet tube.

11. The bioprocess system according to claim 10, wherein said air trap is a disposable air trap, or a swirl type air trap.

12. The bioprocess system according to claim 10, wherein said disposable tubing set further comprises one or more of a disposable UV sensor, a disposable flow sensor, a disposable air sensor, a disposable pH meter, a disposable conductivity meter and a disposable pressure meter.

13. The bioprocess system according to claim 10, wherein all the components of the disposable tubing set are fluidically interconnected and the disposable tubing set can be removed from the base station in one piece.

* * * * *